United States Patent [19]

Defrancisci

[11] Patent Number: 5,073,393
[45] Date of Patent: Dec. 17, 1991

[54] AUTOMATIC PROPORTIONING PASTA SYSTEM

[75] Inventor: Leonard Defrancisci, Manhasset, N.Y.

[73] Assignee: Defrancisci Machine Corp., Ridgewood, N.Y.

[21] Appl. No.: 301,627

[22] Filed: Jan. 25, 1989

[51] Int. Cl.⁵ .............................................. A23L 1/00
[52] U.S. Cl. .................................. 426/508; 426/302; 426/505; 426/557
[58] Field of Search ............... 426/505, 557, 302, 506, 426/508

[56] References Cited

U.S. PATENT DOCUMENTS

| | | | |
|---|---|---|---|
| 1,634,332 | 7/1927 | McGowan, Jr. | 426/557 |
| 2,403,871 | 7/1946 | McBean | 99/103 |
| 3,656,603 | 4/1972 | Bontempi et al. | 198/20 |
| 3,891,192 | 6/1975 | Bontempi et al. | 259/110 |
| 3,928,045 | 12/1975 | Tsunoda et al. | 99/330 |
| 3,951,462 | 4/1976 | DeFrancisci | 302/56 |
| 3,958,503 | 5/1976 | Moore | 99/327 |
| 4,121,301 | 10/1978 | DeFrancisci | 99/353 |
| 4,169,189 | 10/1986 | Kou | 99/334 |
| 4,214,514 | 7/1980 | Contino et al. | 99/330 |

Primary Examiner—Marianne Cintins
Assistant Examiner—Helen Pratt
Attorney, Agent, or Firm—Darby & Darby

[57] ABSTRACT

A method is disclosed for automatically preparing and processing a precise portion of pasta at precise temperatures with fluid agitation. Uniform lengths and portions of pasta dough are extruded into an individual portion-sized cup disposed on a conveyor. Each cup includes a precise number of drain holes which maintain a full liquid level as water is added to the cup. The extruded pasta is precooked in the cup as the cup passes beneath a plurality of hot water jets which provide precise temperature control for optimum cooking, with the water velocity providing fluid agitation to prevent sticking or damage to the pasta. The precooked pasta is then cooled and rinsed by passage beneath another series of spray nozzles, treated with a flavor liquor containing flavor-enhancing ingredients, such as salt or parsley flakes, and treated with oil to prevent excessive agglutination and product loss. The precooked product is then emptied from the cup into an individually sized package for later use by the customer.

7 Claims, 6 Drawing Sheets

AUTOMATIC PROPORTIONING PASTA SYSTEM

TECHNICAL FIELD

This invention relates to a method and apparatus for automatically preparing and processing fresh pasta in uniform lengths and portions, from the initial pasta dough to a final precooked individually sized product, with proportional dough extrusion into individual portion-sized cups for subsequent blanching, rinsing, and flavor/oil treating.

BACKGROUND

Alimentary products are usually prepared from flour, such as semolina, durum or other hard wheat, and water, which are metered in proper proportions and mixed until the wheat absorbs the water, forming a viscous pasta dough. Other ingredients, such as whole eggs or egg whites, are often added to enhance cooking quality. The dough is then extruded or otherwise formed to produce a shaped pasta product, such as spaghetti or cut pasta. The resulting product has a predetermined size, shape, and weight.

After extrusion, the fresh pasta product, commonly referred to in the industry as "green" pasta, may be dried and packaged for later preparation by the consumer However, dried pasta is not as flavorful as fresh pasta, and the pasta is more preferably prepared without ever passing through a costly drying operation. Instead of drying, the green pasta may be cooked by blanching in boiling water for about 12 minutes, and then rinsing to remove a sticky, gelatinized starch from the cooked pasta surfaces A flavor liquor, containing flavor-enhancing ingredients such as salt or parsley flakes, may be disbursed into the pasta, which is treated with a light coating of oil to prevent excessive agglutination with resultant product loss. The precooked pasta is then packaged for later use by the consumer.

Fresh cooked pasta is generally prepared by extruding en masse through a short-cut head or round dye of a mixer-extruder. For spaghetti, the dye is usually 20 inches in diameter and is provided with a knife that continuously cuts the pasta when it reaches a proper length. The cut pasta falls on a conveyor belt in a continuous stream and is sent through a continuous blancher which is a large tube-like vessel through which hot water and green pasta are constantly circulated. An archimedes screw is submerged half-way in the boiling water, to carry the pasta through the blancher. During this process, some of the resulting starch-laden waste water is drawn off and replaced with fresh water. Although the spaghetti has been precut, it is delivered from the continuous blancher in a continuous stream, often accumulating in large tangled masses.

The tangled pasta mass is loaded into large transfer tubs which are then charged with small amounts of flavored liquor. The tubs are placed into tumblers which utilize tumbling action to distribute the flavored liquor through the pasta. The tubs are then charged with oil and additional ingredients, such as parsley flakes, if desired, and placed in another set of tumblers. Finally, the mass of pasta is discharged from the tubs, into a pile for manual proportioning, i.e. separation, weighing and packaging in meal-sized portions of a predetermined weight.

This method and related apparatus suffer from a number of serious disadvantages. For example, the pasta cooking time will vary with the residence time in the blancher. While essentially continuous, cooking in a mass presents the opportunity for some pasta to be swept rapidly through to the discharge screw while some pasta continues to recirculate, producing undercooked or overcooked pasta. In addition, each pasta strand may encounter a varied degree of agitation, depending on entanglements and the degree of fluid agitation. The water temperature in a large blancher may also produce gradients which affect the degree of cooking. All these factors can detrimentally impact flavor.

The dispensing and packaging stages are also labor intensive and very inefficient, requiring transfer of the pasta through a series of vessels, sometimes by hand. For packaging, the precooked product is delivered in tubs containing hot, oily and sticky masses of tangled pasta. The pasta must be weighed and measured in predetermined portions of about 60 to 100 grams and placed in a small dispensing container, from which it is transferred to a packing container, most often a plastic pouch. The difficult process of removing the product from the tub, weighing it, and packaging is usually done by hand on a turntable, in assembly line fashion, which may involve about 45 handlers on three lines for each of two shifts. The weighing process is particularly slow, and averages about 4 portions per person per minute, whereas packaging averages about 165 pouches per minute.

Throughout the entire process, the pasta is handled by both man and machine, resulting in substantial product loss through damage, waste, etc. In addition, quality is negatively impacted due to the time required to both cook and proportion the pasta. The longer it sits, the less appetizing the pasta becomes. The pasta can also degrade and/or become tainted due to bacterial growth or due to foreign matter dropping into the pasta.

One device for cooking pasta is disclosed in U.S. Pat. No. 1,634,332 to McGowan, which describes a canning machine for preparing spaghetti dinners. Dry spaghetti is dosed into conventional cans in predetermined portions. Water, sauce and other ingredients, such as meatballs, are added, each can is sealed, and the can sterilized in a pressurized retort or autoclave-type chamber, which simultaneously cooks the contents of the can.

In U.S. Pat. No. 4,214,514 to Cortino et al., a cooker for foodstuffs is disclosed which includes a plurality of perforated pots movable vertically in a tank between a raised position and a lowered position The foodstuff is manually proportioned and placed in the pot when in the raised position and then lowered, with boiling water injected into the pot to cook the foodstuff while stirring to prevent sticking. After a preset time interval, the pot is returned to its raised position for manual discharge of the cooked foodstuff. Such a system is designed for restaurant use to provide individually cooked meals, ready to serve. U.S. Pat. No. 3,958,503 to Moore similarly discloses a raise/lower cooker.

In U.S. Pat. No. 2,977,902 to Johannes, a perforated basket immersion system is described. A spaghetti pasta is extruded, cut and dropped into perforated baskets, with the pasta undergoing a series of transfers between processing operations. The apparatus uses reservoirs with step conveyors for shaking the pasta containing baskets as they move through the cooking and rinsing reservoir troughs. Such equipment is quite complex, costly and difficult to maintain, with the mechanical shaking providing the potential for product breakage.

Consequently, what is needed in the art is an automated proportioning system which provides individual portions of pasta for packaging in minimum time and with minimum complexity. Such a system should also provide precise temperature and time control to assure uniform processing for optimum quality with a minimum of machine or manual handling.

SUMMARY OF THE INVENTION

It is an object of the present invention to overcome the above-described disadvantages by providing apparatus for the automated, proportional and metered extrusion, dosing, blanching, and delivery of a pasta product without requiring cooked product separation.

It is a further object of the invention to increase the efficiency of portion-controlled precooked pasta production by eliminating the inconvenient and time-consuming transfer of the pasta from one vessel to another during processing.

It is a further object of the invention to eliminate dosing, weighing and packaging steps that have previously been done by hand.

It is yet another object of the invention to reduce or eliminate product loss due to breakage, waste and inconsistent quality that inherently occurs in connection with known devices and methods.

It is yet another object of the present invention to provide a simplified, automated proportioning pasta system which provides relatively precise control over temperature and agitation during processing, producing optimum quality pasta at a minimum equipment cost.

According to the present invention, a pasta product, either dry or freshly extruded, is dosed into a perforated cup in a predetermined portion. Each cup is perforated in an amount sufficient to provide a determined drainage rate such that the pasta remains in water during processing. After each cup is dosed with its proper complement of pasta, it is placed on a conveyor and introduced into a blanching chamber where hot water is directed into the cup by a spray jet. The hot water cooks and agitates the pasta within the cup, with excess starch-laden water drained through the perforations in the cup. The water pressure of the jet is chosen relative to the size of the cup and its perforations, so that during blanching the cup is always properly agitated, even while constantly draining. The cup with the pasta disposed therein is then drained while proceeding to a rinsing chamber where the pasta is rinsed with cold water, directed into the cup by a spray nozzle. After draining the rinse water, flavor and oil sprays may be directed onto the pasta, to enhance the flavor of the final product and prevent undesirable agglutination, with the pasta then tumbled to provide uniform distribution. Each portion of pasta is then transferred from its cup directly into a meal-sized pouch, with the cup washed and returned for another dose of pasta. In this manner, the pasta is prepared entirely in a single vessel, portion by portion, without transfers, eliminating all of the intermediate handling steps.

DETAILED DESCRIPTION OF THE DRAWINGS

Figure 1:
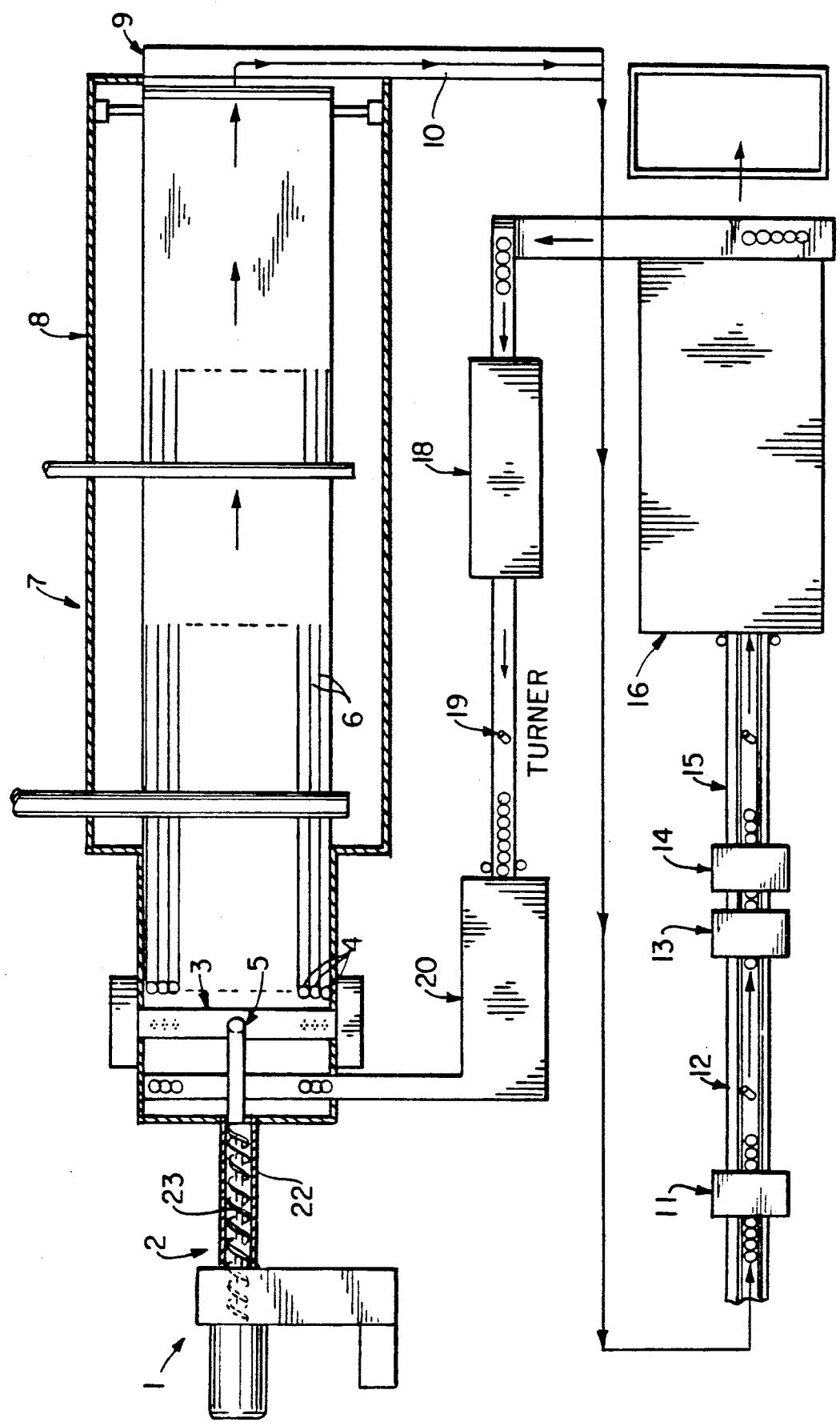
FIG. 1 is a schematic view of the automatic proportioning pasta system of the present invention.

Referring now to FIG. 1, a schematic view of the automatic proportioning pasta system of the present invention is shown, including a mixer 1 connected to an extruder 2 which extrudes pasta through a die 3 for dosing into a plurality of cups 4 located at a cup filling station 5. The cups 4 are placed on a conveyor 6 which travels through a blancher 7 and rinser 8. After passing through the blancher and rinser, the cups are organized by a combiner 9 for transport on a line conveyor 10 to a flavor spray station 11. The cups then move through a tumbler 12 which distributes the flavor spray over the pasta. An oil spray station 13 and parsley spray station 14, with an associated tumbler 15, are also included. The individual cups 4, containing the cooked and flavored pasta, then enter an accumulator 16 which stages the cups for discharge of the pasta. Each cup is then tipped to empty the pasta into a container (not shown) and then simultaneously placed on a return conveyor 17. The empty cups are then passed through a washer 18, inverted in a cup turner 19, and staged in a cup accumulator 20 for return to the cup filling station 5.

The raw pasta ingredients, primarily flour and water, are continuously metered, preferably by computer control, into the mixer 1, which may include paddles on two shafts disposed in the mixer for keeping the ingredients and the resulting dough constantly mixing. An exemplary continuous-feed alimentary pasta mixer is disclosed in U.S. Pat. No. 4,121,301 to De Francisci, the disclosure of which is hereby incorporated by reference. The dough resides in the mixer for approximately 10 to 12 minutes, whereupon the wheat flour absorbs the water and the dough achieves a viscous, almost granular consistency, indicating that it is ready for extrusion.

The dough falls by gravity into the extruder 2 which has a long barrel 22 with an auger 23 disposed therein. The auger 23 drives the dough forward, thereby producing the pressure needed for extrusion. Typically, the extrusion pressure is very high, i.e., in the neighborhood of 1000 psi at the end of the extrusion barrel. The extrusion process is inherently uneven, and is very sensitive to temperature. During extrusion, a temperature differential is created within the dough, with the warmer portions extruded slightly faster. The temperature differential also affects viscosity and shear rates. Therefore, in order to prevent breakage and maintain uniformity in the product, the temperature and pressure during extrusion must be monitored, and should be maintained within the range of 110-130 degrees F. and 900-1100 psi.

Figure 2:
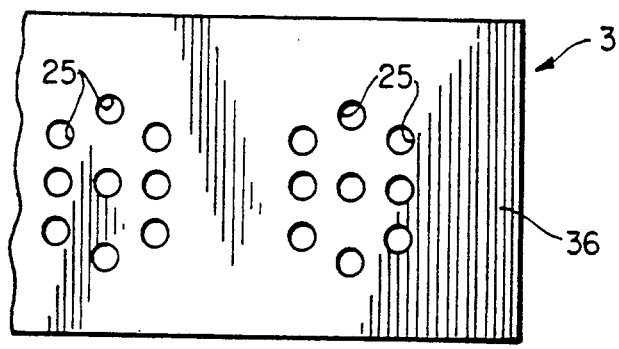
FIG. 2 is an enlarged view of a clustered die head.

The dough is simultaneously and continuously kneaded during the extrusion, via the rotary motion of the auger prior to the point of actual extrusion. When sufficient extrusion pressure is achieved, the leading edge of the dough is extruded through the die 3 which is preferably long and narrow. In a preferred embodiment, the die is about 3 inches wide, 2 inches thick, and 72 inches long. The dough is extruded into spaghetti strands 24 through holes 25 in the die 3, arranged in small clusters 26, with a small space between each cluster (see FIG. 2).

Figure 3A:
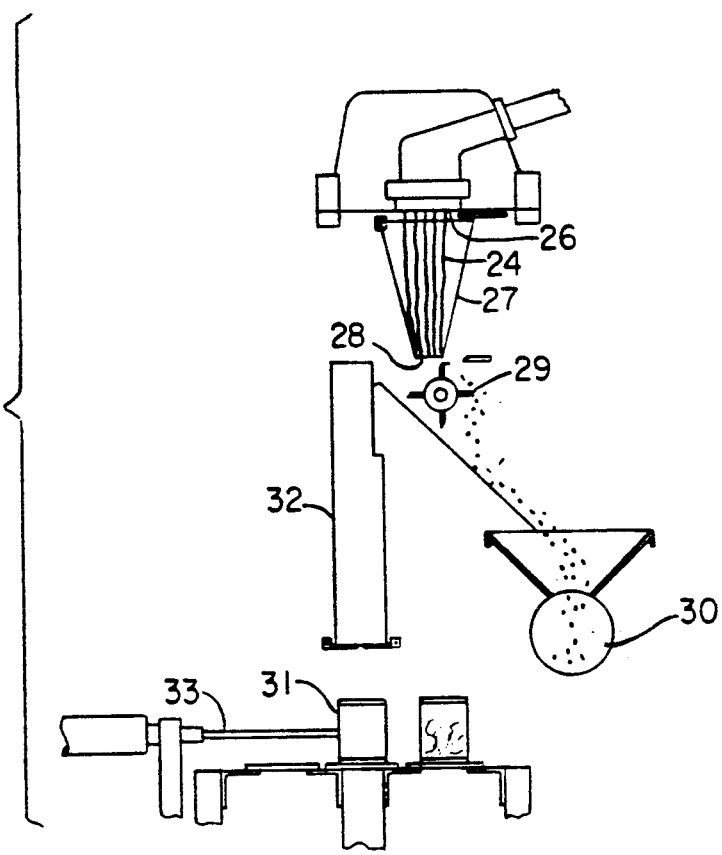
FIGS. 3A, 3B, and 3C are illustrative views of a spaghetti pasta being extruded into individual cups
Figure 3B:
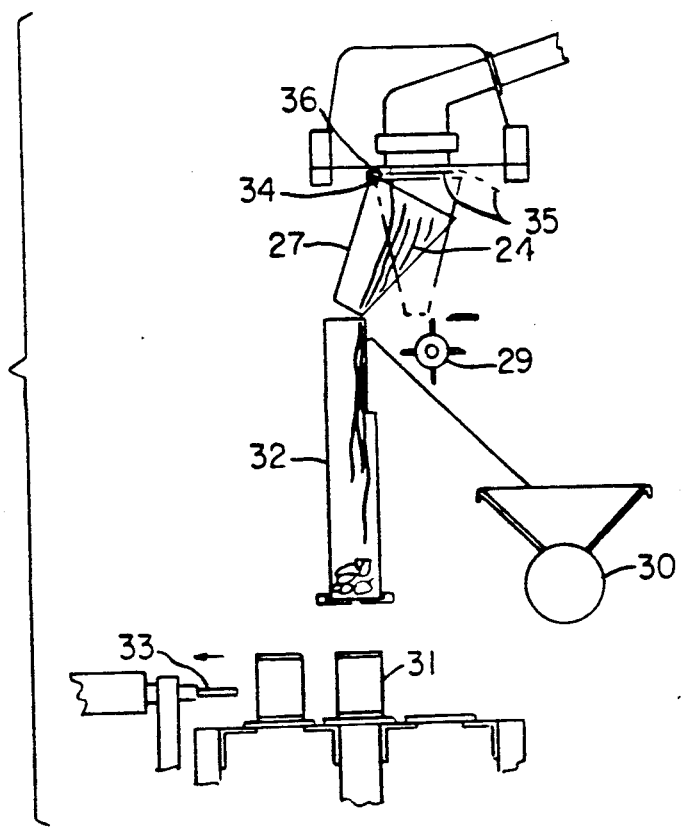
Figure 3C:
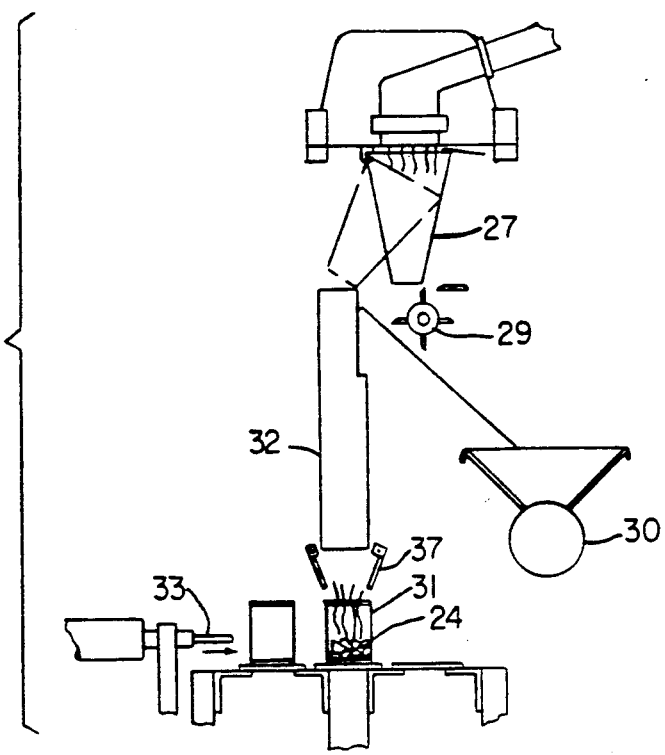

Referring to FIGS. 3A, 3B and 3C, the length of each strand is uniformly maintained by extruding through the die cluster 26 into a funnel guide 27, including an opening 28 at an end thereof. A rotary knife 29 is positioned beneath the opening 28 to trim the ends of the pasta strands extruded through the die cluster 26. The trimmed ends enter a conveyor 30 for return to the mixer 1 to minimize waste. During this extrusion, a cup 31 is positioned beneath a chute 32 by a piston 33, with the cup supplied from the cup accumulator 20 (see FIG. 1). During this positioning, a previously filled cup positioned beneath the chute 32 would be simultaneously moved by the piston 33 onto the conveyor 6.

After a set interval, the funnel guide 27 is tilted about a hinge 34, placing the opening 28 in line with the chute 32. A die knife 35, which is in contact with the die surface 36, is actuated to slide along the surface and cut the strands 24 at the die, assuring uniform lengths of pasta. The strands then drop into the chute 32.

After the die knife 35 retracts, the funnel guide 27 pivots back to align the opening with the rotary knife 29 and more pasta is extruded. When the funnel guide tilts back, a pair of doors 37, located at the end of the chute 32, open and drop the pasta strands 24 into the cup 31. The cycle then repeats by extruding more pasta and positioning an empty cup beneath the chute, with the filled cup pushed onto the conveyor 6.

The automated system advantageously doses the cups with uniform portions of pasta, all having the same weight. This is achieved, even though pasta is extruding in strands through the die cluster at slightly different rates, by insuring that each strand is cut to a equal length before placement in the cup. Each cup is served by a single cluster having the same number of holes of equal diameter. Therefore, each strand of pasta, which in the described embodiment is spaghetti, has the same diameter, and each cup receives the same number of strands.

In a preferred embodiment, the proportional dosing extruder simultaneously serves 17 cups in a parallel line in each cycle, with 17 clusters of holes provided in the die.

While an extruded pasta is discussed, it should be understood that a dry pasta could also be used, with the pasta dosed into the individual cups such as by use of a weigh conveyor, and therefore the discussion of extruded pasta does not limit the scope of the present invention to extruded pasta.

Figure 4:
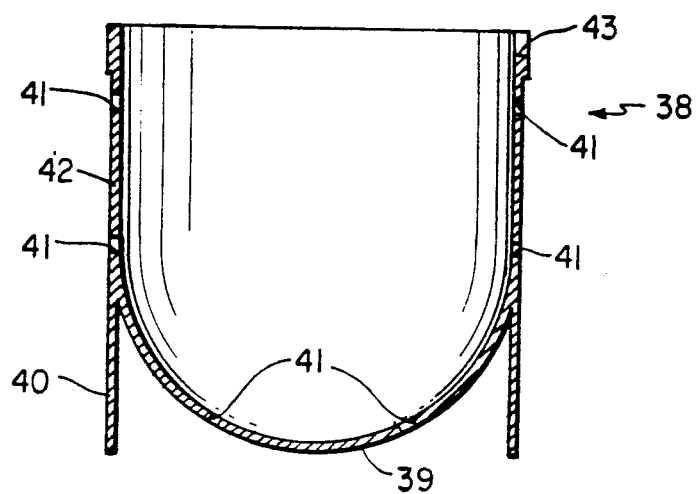
FIG. 4 is a view of an exemplary embodiment of the cup used for cooking and processing pasta according to the invention.

Referring to FIG. 4, a typical cup 38 is shown. The cup has a rounded bottom 39, and a cylindrical support skirt 40 to assure that each cup can ride securely on the various conveyors. Each cup is perforated by a plurality of holes 41 in the bottom 39 and cylindrical sidewall 42. Each cup also includes overflow drain ports 43 at the top of the sidewall. The cup 38 is kept full of water because the amount of water permitted to drain is less than the amount introduced such that the amount in the cup will always be at the overflow level.

Figure 5:
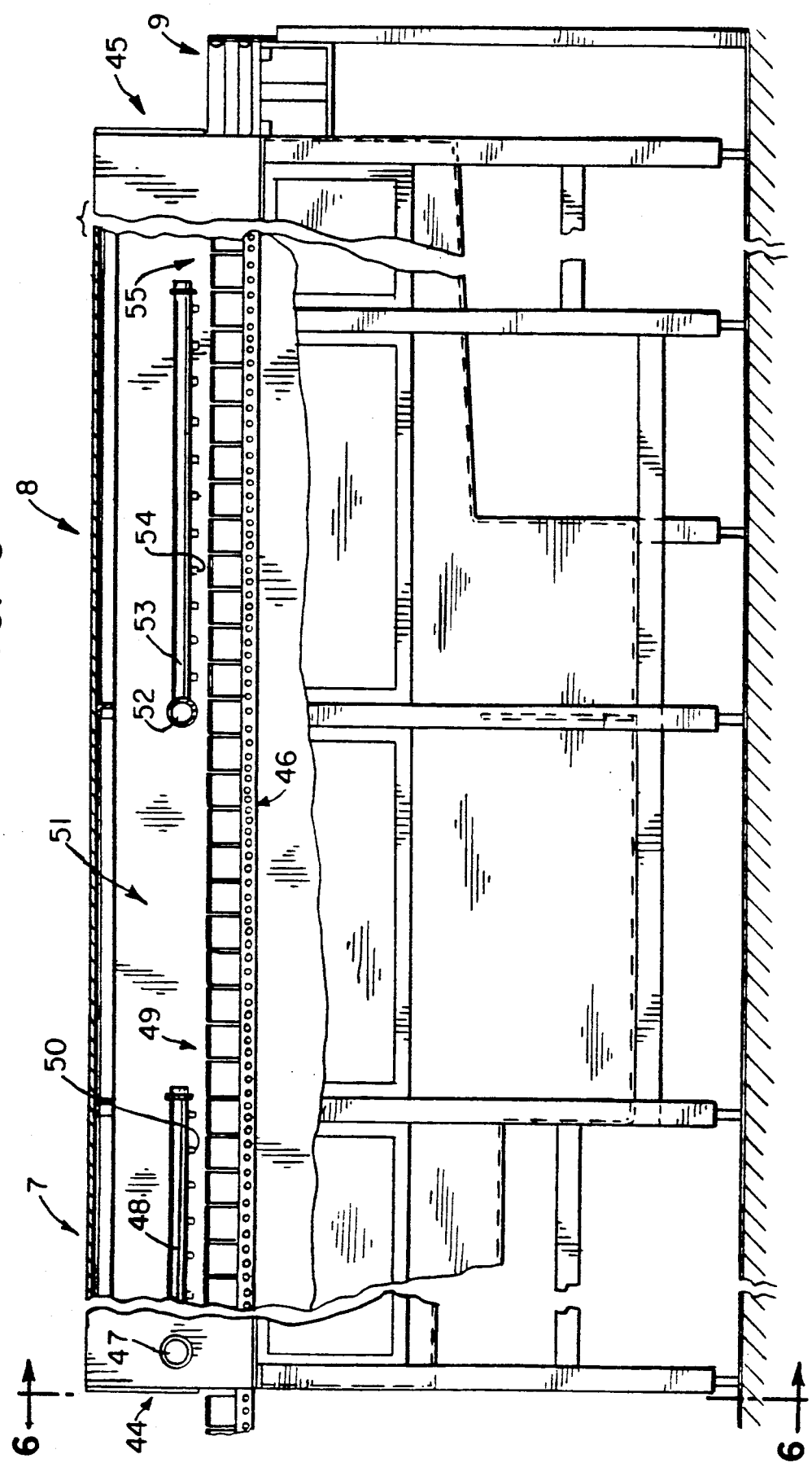
FIG. 5 is a sectional view of a continuous blancher usable with the present invention.
Figure 6:
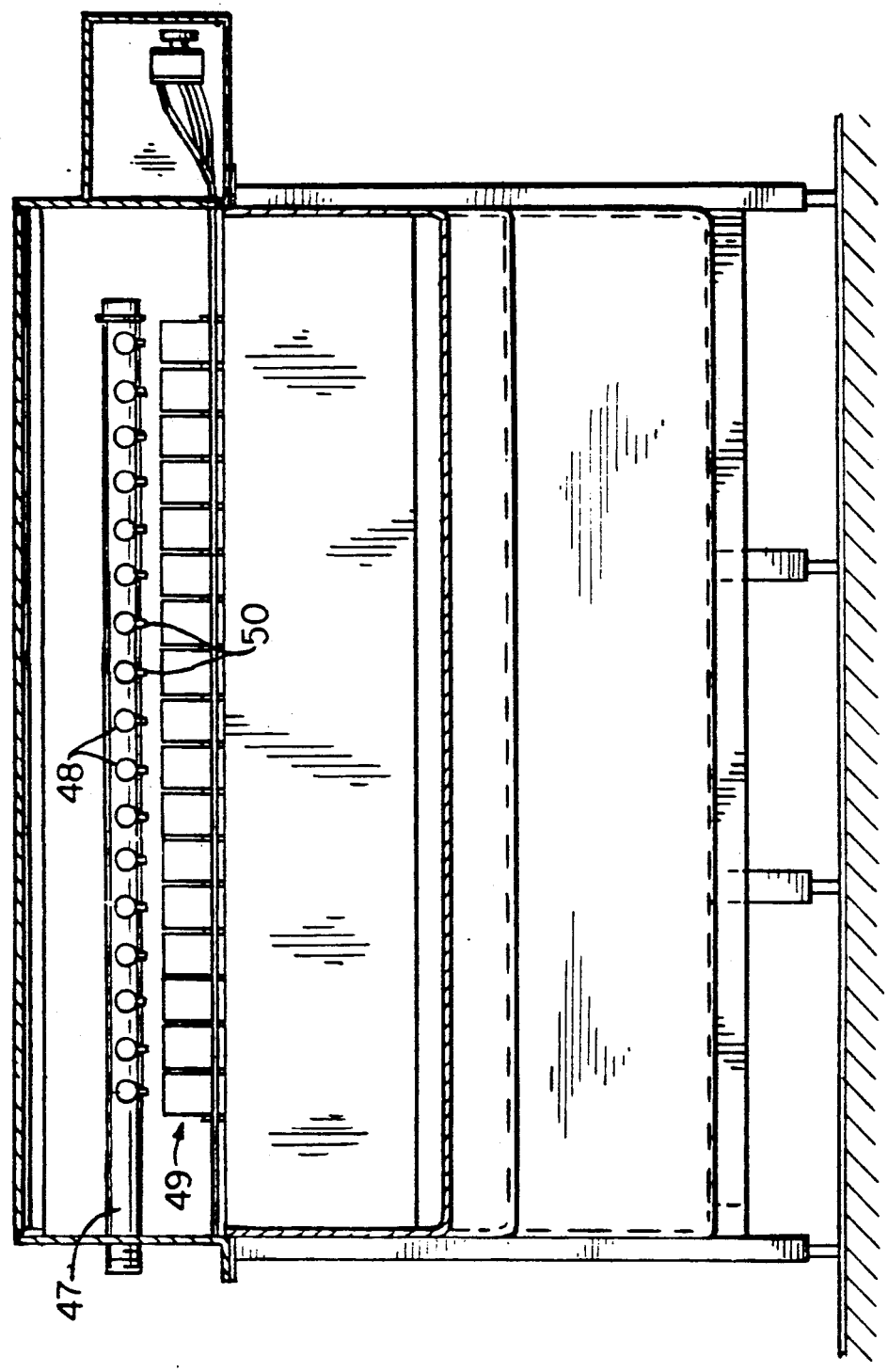
FIG. 6 is a front view of the blancher of FIG. 4.

Referring to FIG. 5, the blancher 7 includes an inlet end 44 and an outlet end 45 with a continuous belt conveyor 46 passing therethrough. The blancher is essentially enclosed and includes means for cooking the pasta and means for rinsing the pasta. The blancher 7 is shown sectionally and in cross-section with a supply header 47 having a plurality of branch headers 48 in parallel line with a plurality of cups 49, formed in a line (best seen in FIG. 6). Each line of cups moves beneath a single branch header. The cups 49 pass beneath a plurality of spray nozzles 50, each nozzle injecting hot water received from the supply header into the cups. Since the cups are on a conveyor, the rate of movement and length of the branch headers determines the time for cooking. Each nozzle produces a jet of hot water which provides fluid agitation of the pasta in the cup passing thereunder. Of course, the characteristics of the jet spray is determined by the nozzle opening and system pressure, and these characteristics may be varied as desired.

The constant flow of water, introduced under pressure during blanching by spray nozzles 50, results in a back pressure within each cup due to the size, shape, and arrangement of the holes 41 in relation to the geometry of the cup, and this causes advantageous agitation and stirring of the product while also draining starch-laden waste water. The amount and velocity of the water is fairly critical, since too much water or too much velocity will erode the product by causing starch to slough off the pasta. Insufficient velocity or volume could result in inadequate mixing, causing the product to become sticky, starchy, and unmanageable, forming lumps which do not cook properly.

The cups 49 then pass through a draining section 51 where the cooking water drains from the cups. The cups then enter the rinser 8 which includes a rinse supply header 52, having branch rinse headers 53 including spray nozzles 54 for injecting cool water onto the pasta, halting the cooking process.

After rinsing, the cups 49 pass through a draining section 55, with the plurality of cup lines then preferably combined in the combiner 9 to form a single cup line.

Figure 7:
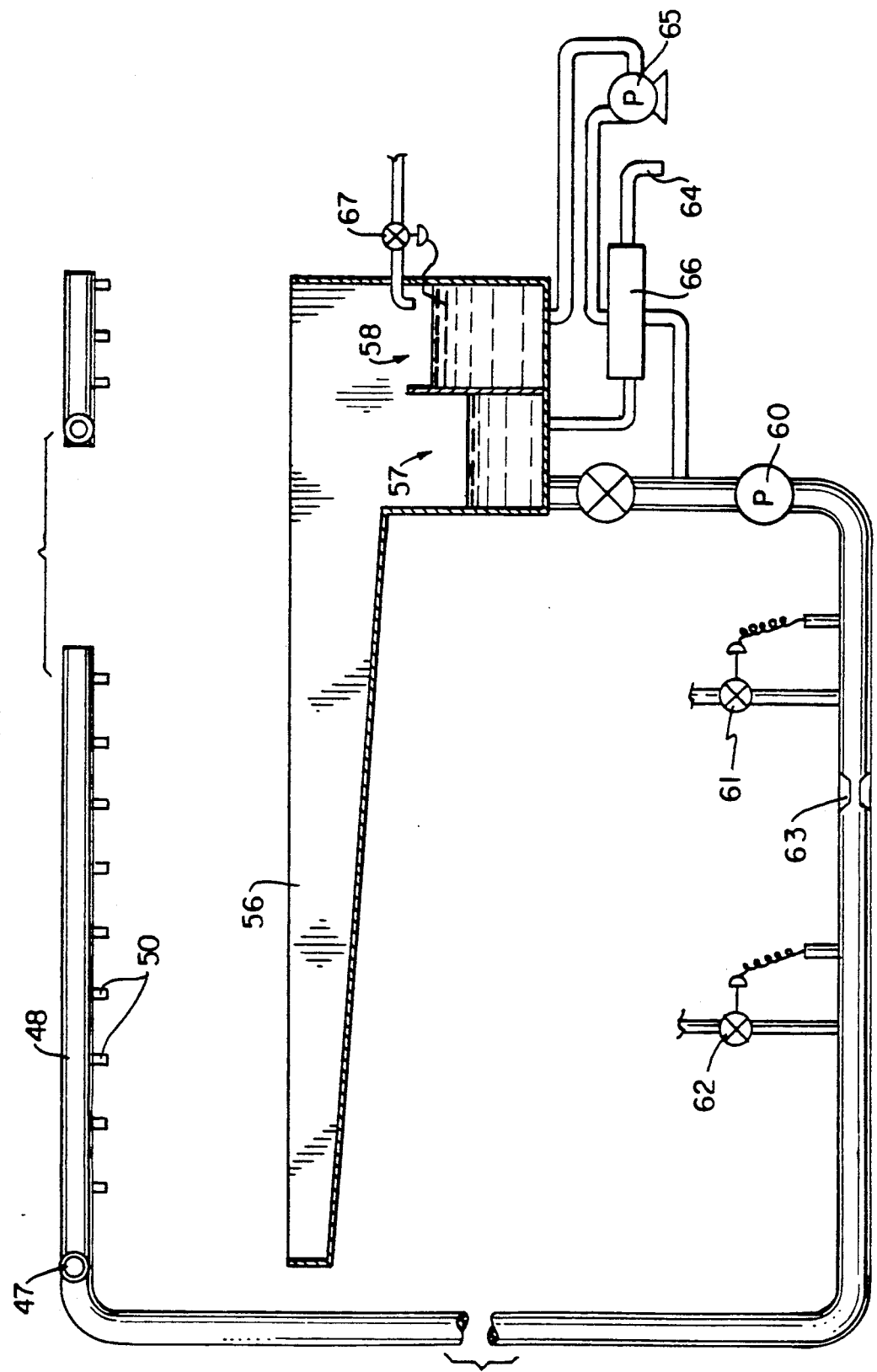
FIG. 7 is an illustrative view of the water flow system for the blancher of FIG. 5.

Referring to FIG. 7, an illustrative water supply system for the blancher is shown. Beneath the continuous belt, a drain pan 56 is positioned to collect the water which drains from the cups in the blanching section. The pan leads to a blanching reservoir 57 which is adjacent to a rinsing reservoir 58, with the reservoirs separated by a baffle 59. The blanching reservoir is fluidically connected to a pump 60 which supplies blanching water to the supply header 47. The pump provides the proper pressure and flow to supply the nozzles 50 In addition, means are provided for controlling the water temperature. First and second steam valves, 61 and 62, supply direct steam injection into the blanching water, utilizing the water temperature to control the addition rate. An in-line mixer 63 assures intimate mixing and uniform heat distribution. Of course, other means for supplying hot water to the blancher may also be used.

During the blanching process, some water leaves the system through absorption by the pasta, and also through a waste stream 64 which prevents the buildup of starch in the system. Makeup water is provided by using fresh water to rinse the pasta and collecting the rinse water in the rinse water reservoir for addition to the blanching water. Prior to addition, the cooling water is preheated through interchange with the hot waste stream. A pump 65 removes water from the cooling water reservoir for passage through a heat exchanger 66. The waste stream passes through the heat exchanger before discharge. Additional makeup water may be added to maintain the proper level in the cooling water reservoir through a valve 67, responsive to a level control signal.

Utilizing the cup as the cooking vessel allows precise control of the cooking process, assuring uniform cooking and a constant feed of fresh hot water. With the inventive system, each strand is exposed to a precise temperature controlled water for a precise time, with controlled agitation, assuring optimum quality. Previous systems used large reservoirs and pasta immersion with the potential for temperature gradients to cause over or under cooking, while also allowing a buildup of waste products. In addition, agitation varied considerably when such things as mechanical walkers or shakers were used to agitate the pasta, resulting in tearing of the pasta through banging against the sides of a perforated basket, or sticking of the pasta to the basket walls.

In a preferred embodiment, hot water is introduced during the blanching stage and cold water introduced during the rinsing stage through spray nozzles arranged in a matrix determined by the matrix of cups passing through the device in parallel rows, so that at any given moment each cup is receiving an independent injection from at least one dedicated nozzle. In the embodiment having 17 lanes, shown in FIG. 1, each cup has a diameter of about 4 inches, the nozzles are placed at intervals of about 4.25 inches, with the distance between the center of each cup and the center of each nozzle being about 4.5 inches. Therefore, the cups undergo constant agitation as they are always under a spray nozzle. The arrangement of nozzles is especially critical in the early blanching stage, since it is desirable to fill the cups with hot water as rapidly as possible, to achieve rapid cooking, without damaging the product through excessive heat or agitation, with 17 lanes, the portion-controlled cups can be processed at a rate of about 165 cans per minute with a maximum cook time of about 11 minutes.

The cups are moved through the blancher on the conveyor 6 which allows varying the cooking rate. At the slowest rate (maximum cooking time) the cups travel through the system toe to toe. At faster rates, there is a space between each cup, and the water volume and pressure should be varied accordingly, depending on the desired cooking time and cooking quality. Variations in the uniformity of pressure throughout the system can be suppressed, and uniformity generally maintained, by conventional means, such as using a pressure-pump system.

The conveyor system 6 may be of any suitable design but is preferably in segments, with from six to eight rolls driven by a single drive keyed together with a drive chain, but having independent gear systems to permit independent speed adjustments. The conveyor should also be porous to allow water drainage therethrough. The line conveyor 10 and return conveyor 17 may be roller or belt type conveyors of conventional design, since these simply convey the cups through the various stations.

The combiner 9 may comprise a funnel accumulator, which narrows the many parallel row of cups into a single line, or may simply comprise a perpendicular conveyor placed at the end of the conveyor 6. Thus, the first can in each row is moved onto the combiner conveyor and tangentially removed in a line.

The flavor station 11 utilizes spray jets directed into the cups for injecting a flavor liquor, which may include water and conventional flavor-enhancing ingredients, such as salt and garlic. In order to uniformly expose the cooked product to the flavoring liquor, the cups are placed on the traveling tumbler 12, which gently tumbles the cup, rotating it at different speeds and angles using, for example, a pair of urethane belts. This step can be repeated with additional flavoring sprays during tumbling, if desired.

It may be advantageous to additionally treat the product with oil to prevent undesirable agglutination of the final precooked pasta product. Again, tumbling should be used to distribute the oil uniformly on the cooked product. Referring to FIG. 1, an oil station 13 utilizes spray jets directed into the cups for injecting oil onto the pasta. A parsley spray station 14 follows the oil addition. In order to uniformly expose the cooked product to the oil and parsley, the cups are placed on a second traveling tumbler 15, which gently tumbles the cup, rotating it at different speeds and angles using, for example, a pair of urethane belts.

After the post-cooking processing, the cups are delivered to the accumulator 16, where the cups may be stored temporarily pending manual or automatic packaging of the contents. The accumulator may simply comprise a line conveyer arranged in a serpentine pattern to provide residence time.

The precooked product is packaged by dumping the contents of each cup into an individual pouch or other container, according to known means. Automatic packaging may also be used with each cup conveyed to a pouch filler (not shown), with each cup inverted to transfer the cooked product into a meal-sized soft plastic pouch, with automatic sealing of the pouch. Generally, the cup and pouch will be conveyed in parallel lines, the cup above the pouch. The cup will be inverted to empty the pasta into the pouch and then placed on the return conveyor 17. The pouches may then be vacuum sealed and quick frozen for inclusion in frozen dinners. However, packaging in cans or other containers is also contemplated. The total processing time for a single serving of pasta, from extrusion to packaging, utilizing the automatic proportioning pasta system is approximately 16 minutes.

After emptying, each cup is placed, still inverted, on the return conveyer 17 and conveyed to the cup washer 18 where the cups may be sprayed with hot water to remove any residue or starch buildup. The cups then travel through a cup turner 19 to reset the cups in the proper orientation for filling. A second accumulator 20 is provided for staging the empty cups prior to refilling with pasta for another cycle.

Utilizing individual cups designed for continuous overflow and with fluid rather than mechanical mixing provides precise temperature control while minimizing product damage. Avoiding an immersion system eliminates temperatures and agitation gradients, assuring optimum quality. In addition, accumulated waste in the processing fluid is minimized, producing a higher quality product which is more appetizing and flavorful to the consumer. Also, utilizing individual portion-sized cups assures that all the pasta is cooked for a precise period of time, without damage and rinsed with fresh water, thereby providing optimum quality and consistency.

It will be understood by those skilled in the art that the foregoing examples and drawings are illustrative only, and do not serve to limit the scope of the invention or the appended claims.

What is claimed is:

1. A pasta preparation method comprising:
   a. providing a predetermined portion of green pasta;

b. adding the predetermined portion of green pasta to a cup having a volume corresponding to the predetermined portion of the green pasta, and means for draining liquid at a substantially precisely controlled first rate;

c. filling the cup with hot water to maintain a level of the hot water above the pasta to cook the pasta, the hot water being added at a second rate greater than the first rate, the hot water having temperature and pressure sufficient to cook the pasta;

d. draining the cup at the first rate, the hot water filling being stopped and the cup being drained to a level below the pasta when the pasta has been cooked;

e. filling the cup with cool water to maintain a level of the cool water above the pasta to rinse the pasta, the cool water being added at a rate greater than the first rate, the cool water having a substantially precisely controlled temperature and pressure;

f. thereafter draining the cup at the first rate, the cool water filling being stopped and the cup being drained to a level below the pasta when the pasta has been rinsed; and g. emptying the cooked and rinsed pasta into a container.

2. The method of claim 1 wherein the predetermined portion of pasta is provided by extruding a precise portion of pasta dough into the cup.

3. The method of claim 1 wherein the cup is drained by providing a plurality of drain holes and an overflow port, the total openings sized to maintain a full liquid level as the cup is filled and drained simultaneously.

4. The method of claim 1 wherein the hot water is provided at a temperature of about 200–210° F.

5. The method of claim 1 further comprising adding a flavor liquid to the cooked and rinsed pasta in the cup, and tumbling the cup to achieve uniform distribution of the flavor liquor over the pasta.

6. The method of claim 1 further comprising adding an oil to the cooked and rinsed pasta in the cup, and tumbling the cup to achieve uniform distribution of the oil over the pasta.

7. The method of claim 1 further comprising conveying the cup with the pasta therein beneath a hot water filling station and a cool water rinsing station.

* * * * *